United States Patent Office 2,723,963
Patented Nov. 15, 1955

2,723,963

NON-FLAMMABLE PLASTIC COMPOSITIONS AND METHOD OF MAKING SAME

Raymond M. Price, Midland, and Arthur F. Roche, Freeland, Mich., assignors to The Dow Chemical Company, Midland, Mich., a corporation of Delaware No Drawing. Application January 21, 1953,
Serial No. 332,527

11 Claims. (Cl. 260—33.8)

This invention concerns certain non-flammable plastic compositions and a method of making the same. It pertains especially to non-flammable, moldable compositions comprising a flammable alkenyl aromatic resin having a small proportion of one or more of a limited group of organic bromides incorporated therewith.

By an "alkenyl aromatic resin" is meant a solid polymer of one or more polymerizable alkenyl aromatic compounds. Such polymer comprises in chemically combined form at least 50 per cent by weight of at least one alkenyl aromatic compound having the general formula:

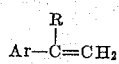

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, alpha-methylstyrene, ortho-methylstyrene, meta-methylstyrene, para-methylstyrene, ar-ethylstyrene, or ar-chlorostyrene; the solid copolymers of two or more of such alkenyl aromatic compounds with one another; and solid copolymers of one or more of such alkenyl aromatic compounds with minor amounts of other readily polymerizable olefinic compounds such as divinylbenzene, methylmethacrylate, or acrylonitrile; etc.

The expressions "non-flammable" and "flame-proof," as employed herein, mean incapable of burning or sustaining a flame for more than 15 seconds after a composition has been fully heated in an open flame and then removed from the flame used to heat the same. In other words, the compositions provided by the invention are self-extinguishing after removal from a flame used to heat the same.

It is known that the halogen content of halogenated organic compounds often has an effect of reducing the flammability both of the compound containing the halogen and of flammable organic materials intimately admixed therewith. It is also known that bromine-containing compounds possess, in most instances, a greater flame-retarding action than do corresponding chlorine-containing compounds. However, the organic bromides differ widely among themselves in effectiveness as flame-retarding agents. Many organic bromides have little or no action of reducing the flammability of combustible organic materials admixed therewith. Also, many organic bromides are excessively unstable to light or heat and cause pronounced discoloration of plastic compositions comprising the same on standing, or during molding of the compositions. A considerable number of the organic bromides decompose to evolve hydrogen bromide and lose their fire-retarding action at temperatures lower than the combustion point of compositions comprising the same. The organic bromides are, in most instances, far more expensive than polystyrene. Also, most organic agents, including organic bromides, have an effect of impairing to some extent one or more of the properties, e. g. of reducing the tensile strength, impact strength, or heat distortion temperature, etc., of polystyrene and other alkenyl aromatic resins when incorporated with the resin. This effect becomes greater as the proportion of such addition agent is increased. Accordingly, for practical employment with the alkenyl aromatic resins, it is necessary that an organic bromide be used in small proportion, e. g. in amount not greater than 10 per cent by weight, and that it be effective in flame-proofing the resins when employed in such small proportions. It is also desirable that the organic bromide be compatible with such alkenyl aromatic resin so that it may uniformly be incorporated with the latter to obtain a non-flammable composition of good appearance.

We have discovered a group of organic bromides which are effective in flame-proofing alkenyl aromatic resins when admixed therewith in minor amount. We have further found that these organic bromides are compatible with the resins in amount sufficient to render the latter non-flammable and, when added in minor amount, e. g. 10 per cent by weight or less, do not seriously impair the appearance or properties of the resin. We have also found that the alkenyl aromatic resin compositions comprising these organic bromides undergo only slight, or no, discoloration during molding or extrusion at usual molding and extrusion temperatures, or on standing under exposure to light. In those instances in which slight discoloration does occur during molding of the compositions, the discoloration may be prevented by also incorporating, in the composition, a small amount, e. g. 1 per cent by weight or less of a stabilizer such as di-(tertiary-butyl) tin maleate which is effective in stabilizing halohydrocarbons such as carbon tetrachloride against the action of moisture, light, or moderately elevated temperatures such as from 100° to 200° C. However, the compositions of the invention undergo only slight discoloration, if any, during molding or on standing and addition of a stabilizing agent is not required.

The organic bromides of the invention are polybrominated organic compounds which are unsymmetrical with respect to the center of gravity of the molecule and which may be formed by chemical addition of bromine to an olefinic linkage of olefinic compounds. However, only certain of the compounds resulting from addition of bromine to olefines and, more particularly, only certain of such molecularly unsymmetrical bromine addition compounds, are suitable for the purpose of the invention. Furthermore, organic bromides which are satisfactory as flame-proofing agents for the alkenyl aromatic resins have been found less effective as agents for reducing the flammability of other organic plastics. For instance, the incorporation of 3 per cent by weight of alpha, beta-dibromoethyl-2,5-dichlorobenzene (one of the agents found highly effective in flame-proofing polystyrene) in a solid polymer of ethylene reduces greatly the flammability of the polymer, but does not prevent it from burning and sustaining a flame. The incorporation of 3 per cent of alpha, beta-dibromoethyl-2,5-dichlorobenzene in ethyl cellulose, and also in Plexiglas (an acrylate resin) does not prevent ready burning of these plastics and sustaining of a flame. The effectiveness of organic bromides in flame-proofing organic plastics appears to be dependent both on the kind of organic bromide employed and the identity of the plastic material. The invention is limited to molecularly unsymmetrical organic polybromides which are effective in flame-proofing alkenyl aromatic resins and to the non-flammable alkenyl aromatic resin compositions and preparation of the same.

We have observed that to be suitable for use in small proportions, as an agent for flame-proofing alkenyl aromatic resins, an organic bromide must be stable against decomposition at usual molding temperature of from 140° or lower to 225° C. or thereabout, but must decompose with evolution of hydrogen bromide at temperatures closely approaching, e. g. within 100° C. below, the combustion temperature of the plastic. It is also important that it possess the other desirable properties hereinbefore mentioned, e. g. that it be compatible with the resin and not seriously impair the properties of the latter when added in amount sufficient to render the composition non-flammable. We have found that the effectiveness of the bromine addition compounds as agents for flame-proofing the alkenyl aromatic resins varies inversely with the reaction rate constants for the reactions of bromine with corresponding olefinic compounds to form bromine addition compounds, and that the organic bromine addition compounds having formation rate constants within certain limits, hereinafter given, are suitable for the purpose. Bromine addition compounds having excessively high rates of formation are unstable at only moderately elevated temperatures and tend to decompose and lose their flame-retarding action before a plastic composition comprising the same has been heated to the combusion temperature. The bromine addition compounds of too low a rate of formation are difficult to prepare by such addition reaction and exhibit little if any action (due presumably to their thermal stability) in reducing the flammability of a flammable organic plastic comprising the same.

The rate of reaction for formation of such bromine addition compound varies with changes in the temperature or kind of medium in which the reaction is carried out. The reaction rate constants, K, for the reactions of bromine with olefinic compounds, which are hereinafter given were determined as follows. All of the reactions were carried out at approximately 25° C. using carbon tetrachloride as a reaction medium. A from 1 to 2 gram sample of the olefinic reactant was carefully weighed and was diluted with carbon tetrachloride to a measured total volume, usually of 100 milliliters. A from 5 to 10 milliliter aliquot portion of the resultant solution was introduced into a flask and a measured amount of a 1/10-normal solution of bromine in carbon tetrachloride was added, the amount of bromine thus added being in excess over that theoretrically required to react with the olefinic linkages of the olefinic reactant. A measured time after adding the bromine, at which time only from 10 to 20 per cent or thereabout of the olefinic compound had been consumed, an aqueous sodium iodide solution of 10 per cent concentration was added in amount sufficient to react with residual bromine in the mixture, thus terminating the bromine addition reaction. The mixture was agitated and titrated with a 1/10-normal sodium thiosulphate solution, whereby the amount of bromine which had not been consumed by the olefinic reactant was determined. The difference between this amount and the amount of bromine initially employed is the amount of bromine consumed by reaction with the olefinic reactant. Since one molecular equivalent of bromine is consumed in reacting with one mole of a mono-olefine, the amount of bromine consumed is a measure of the amount of the olefinic reactant consumed. The amount of the olefinic reactant which remained unconsumed is obtained by difference. The reaction rate constant, K, is calculated, as usual for bimolecular reactions.

The molecularly unsymmetrical organic bromine addition compounds which are suitable for the purpose of the invention are ones having K values, determined as just described, of from 0.02 to $4 \times 10^2$, and preferably from 0.1 to 10. Examples of bromine addition compounds having K values within these limits are alpha,beta-dibromoethylbenzene; alpha,beta-dibromo-2-chloroethylbenzene; alpha-beta-dibromo-2,5-dichloro-ethylbenzene; and ethyl alpha,beta-dibromoisobutyrate; etc. Other unsymmetrical organic polybromides having K values within said limits and suitable for employment in practice of the invention, are hereinafter mentioned. Examples of bromine addition compounds having K values greater than those given above and which have been found unsatisfactory for use as flame-proofing agents for alkenyl aromatic resins are alpha,beta-dibromoethyl butyl ether and alpha,beta-dibromoethyl-4-ethoxybenzene. Other unsatisfactory bromine addition compounds will hereinafter be mentioned.

The unsymmetrical organic polybromides which are suitable for use in the invention have been referred to above as "bromine addition compounds" because they are capable of being formed by addition reactions between bromine and olefinic compounds, but the invention is not limited by a requirement that they be made by such a reaction. In general, the suitable organic polybromides are compounds having a bromine atom attached to each of at least two adjacent carbon atoms in an aliphatic, e. g. a chain or an alicyclic, portion of the molecule. Although they are, in most instances, made by a reaction between bromine and an olefinic compound, they may be made by other kinds of reactions, e. g. by bromine substitution reactions. For convenience, the suitable organic polybromides are hereinafter referred to as "organic polybromide addition compounds," it being understood that this expression is not restrictive as to the method by which the compounds have actually been prepared.

In practice of the invention, from 1 to 10, preferably from 3 to 5, per cent by weight of one or more of the afore-described unsymmetrical organic polybromide addition compounds having a K value of from 0.02 to $4 \times 10^2$ is incorporated throughout a body of a flammable alkenyl aromatic resin such as polystyrene. Incorporation of the unsymmetrical organic polybromide in the resin may be accomplished in any of a number of ways. In most instances, a non-uniform mechanical mixture of the resin and the organic polybromide is heated to a plastifying temperature, e. g. between 100° and 225° C., and the heated mixture is milled on compounding rolls or with other mixing devices, such as by passage through an extruder having a worm feed, to cause thorough distribution of the organic polybromide throughout the body of resin. If desired, the alkenyl aromatic resin may be heated and milled and the organic bromide be added during milling of the heat-plastified material. Again, the organic polybromide and the resin may be dissolved together in a relatively volatile mutual solvent such as benzene, toluene, carbon tetrachloride, or ethylene chloride, etc., and the solvent thereafter be distilled or vaporized from the solution. Other addition agents such as pigments, lubricants, flow agents, or stabilizers for the unsymmetrical organic polybromide, etc., may also be incorporated in the plastic composition by any of the foregoing procedures, but are not required. Any of the procedures just mentioned results in a non-flammable, thermoplastic composition which may be molded or extruded to obtain non-flammable articles.

The following examples describe a number of ways for practice of the invention and illustrate certain of its advantages, but are not to be construed as limiting the invention.

EXAMPLE 1

In each of a series of experiments, the reaction rate constant, K, for the addition reaction between bromine and an olefinic compound to form an organic polybromide was determined. Each reaction was carried out at a temperature of approximately 25° C. in carbon tetrachloride as a reaction medium. In each test, a small sample, e. g. from 1 to 2 grams, of the olefinic starting compound was weighed and dissolved in a measured amount of the above-mentioned liquid medium. An aliquot portion of the resultant solution was treated with a measured amount of a 1/10-normal solution of bromine in carbon tetrachloride, the bromine being added in amount greater than that theoretically required to react with the olefine groups of the olefinic starting material. At a measured time after mixing the starting materials, which time was far less than that required for complete reaction, an aqueous sodium iodide solution of 10 per cent concentration was added in amount sufficient to react with the unconsumed bromine in the mixture. The amount of iodine thus liberated was determined by titrating the mixture with a $1/10$-normal aqueous sodium thiosulphate solution. The by addition reactions between bromine and corresponding olefinic compounds. It also names the olefinic compounds from which each organic polybromide may be formed and gives the constant, K, for the rate of reaction of bromine with such olefinic compound.

Table I

| Exp't No. | Organic Polybromide | Olefinic Reactant | K |
|---|---|---|---|
| 1 | 1,2,2-trichloro-1,2-dibromoethane | trichloroethylene | $<4 \times 10^{-4}$ |
| 2 | methyl alpha, alpha, beta-tribromo-propionate | methyl alpha-bromoacrylate | $1.75 \times 10^{-3}$ |
| 3 | methyl alpha, beta-dibromo-alpha-chloro-propionate | methyl alpha-chloroacrylate | $1.75 \times 10^{-3}$ |
| 4 | alpha, beta-dibromo-propionitrile | vinyl cyanide | $2.5 \times 10^{-2}$ |
| 5 | 1,2-dibromo-1-chloro-ethane | vinyl chloride | $^1 3.4 \times 10^{-2}$ |
| 6 | alpha, beta-tibromoethyl-pentachlorobenzene | pentachloro-styrene | $3.9 \times 10^{-2}$ |
| 7 | benzyl alpha, beta-dibromopropionate | benzyl acrylate | $6.4 \times 10^{-2}$ |
| 8 | ethyl alpha, beta-dibromo-alpha-methyl-propionate | ethyl methacrylate | $9 \times 10^{-2}$ |
| 9 | 1,2-dibromo-1,1-dichloroethane | vinylidene chloride | $^1 1.58 \times 10^{-1}$ |
| 10 | ethyl alpha, beta-dibromopropionate | ethyl acrylate | $3.1 \times 10^{-1}$ |
| 11 | nonyl alpha, beta-dibromopropionate | nonyl methacrylate | $3.2 \times 10^{-1}$ |
| 12 | alpha, beta-dibromo-ethyl-2,5-dichloro-benzene | 2,5-dichlorostyrene | 1.7 |
| 13 | 1,1,2-tribromoethane | vinyl bromide | 2.1 |
| 14 | 2,3-dibromo-1-chloro-propane | allyl chloride | 3.9 |
| 15 | 2,3-dibromo-4-methyl-2,4-diphenyl-pentane | 4-methyl-2,4-diphenyl-2-pentene | 5.2 |
| 16 | 1,2-dibromoethyl benzoate | vinyl benzoate | 19 |
| 17 | propylene bromide | propylene | 52 |
| 18 | alpha,beta-dibromo-ethyl-2-chlorobenzene | 2-chlorostyrene | 92.2 |
| 19 | 1,2-dibromoethyl acetate | vinyl acetate | $1.15 \times 10^2$ |
| 20 | alpha, beta-dibromo-ethyl-benzene | styrene | $1.7 \times 10^2$ |
| 21 | 1,2-dibromo-isobutane | isobutylene | $2.7 \times 10^2$ |
| 22 | mixture of ar-di-(alpha, beta-dibromo-ethyl) benzene and ar-ethyl-alpha, beta-dibromo-ethyl-benzene | mixture of 35 wt. percent of divinyl-benzene and 65% ar-ethyl-styrene | $2.8 \times 10^2$ |
| 23 | 2,3-dibromo-1-propanol | allyl alcohol | $4.5 \times 10^2$ |
| 24 | alpha, beta-dibromo-ethyl-4-chlorobenzene | 4-chlorostyrene | $6.7 \times 10^2$ |
| 25 | 2,3-dibromo-4-methyl-2,4-di-(ar-dichloro-phenyl) pentane | 4-methyl-2,4-di-(ar-dichlorophenyl)-2-pentene | $8.1 \times 10^2$ |
| 26 | 2,3-dibromopentane | 2-pentene | $8.7 \times 10^2$ |
| 27 | 1,2-dibromo-2-ethyl-hexane | 2-ethyl-1-hexene | $9.7 \times 10^2$ |
| 28 | alpha-beta-dibromo-isopropylbenzene | alpha-methylstyrene | $3.7 \times 10^3$ |
| 29 | alpha,beta-dibromo-ethyl-4-ethoxy-benzene | 4-ethoxystyrene | $^1 6.1 \times 10^5$ |
| 30 | n-butyl 1,2-dibromo-ethyl ether | n-butyl vinyl ether | $^1 1.8 \times 10^7$ |

[1] Average value for two or more determinations.

amount of iodine determined is molecularly equivalent to the amount of bromine remaining unconsumed when the reaction between bromine and the olefinic compound was terminated. The difference between such unconsumed bromine and the amount of bromine initially employed is the amount of bromine consumed by reaction with the olefinic compound. Since one gram molecular weight of bromine reacts by adding chemically to one grame chemical equivalent weight of the olefinic compound, the mols of bromine consumed correspond to the chemical equivalents of the olefinic compound consumed. By a gram chemical equivalent weight of the olefinic compound is meant the gram molecular weight of the compound divided by the number of olefinic linkages in the molecule. The amount of the olefinic compound remaining unreacted is obtained by difference. From this data, the reaction rate constant, K, for the formation of each organic polybromide was calculated, as usual, for bimolecular reactions, in accordance with the formula:

$$K = \frac{R(C_B)}{\left(\frac{M(C_m)}{M_o}\right)\left(\frac{B(C_B)}{B_o}\right)}$$

wherein R is the per cent by weight of the bromine, initially employed, which was consumed per minute; $C_B$ is the initial molal concentration of the bromine; $C_m$ is the initial molal concentration of the olefinic reactant; $B_o$ is the initial weight of the bromine; $M_o$ is the initial weight of the olefinic reactant; B is the weight of bromine remaining unreacted when the bromine addition reaction was terminated; and M is the weight of the olefinic compound remaining unreacted when the bromine addition reaction was terminated. The above equation may be simplified to read:

$$K = \frac{R(M_o)(B_o)}{MB(C_m)}$$

The following table lists a number of unsymmetrical organic polybromides which are capable of being formed The unsymmetrical organic polybromides listed in experiments 4–22 of the table all are products obtainable in reactions, for the bromination of olefinic compounds, having K values of between 0.02 and $4 \times 10^2$ and all of said organic polybromides are suitable for employment as agents which may be incorporated with alkenyl aromatic resins to flame-proof the resins. The organic polybromides listed in experiments 23–30 of the table are compounds obtainable in bromine addition reactions having K values outside the range just given and the organic polybromides of these experiments, 23–30 are not satisfactory as flame-proofing agents for incorporation in the resins.

EXAMPLE 2

A non-uniform mixture of 96.75 parts by weight of granular polystyrene, 3 parts of chlorinated alpha,beta-dibromoethylbenzene (having an estimated K value of between 0.5 and 2 and prepared as described in Example 3) and 0.25 part of dibutyl tin maleate was passed through a heated extruder wherein the polystyrene was heated to a plastifying temperature and the chlorinated alpha,beta-dibromoethylbenzene and dibutyl tin maleate were dispersed (and apparently dissolved) in the polystyrene by the milling action of a worm for forwarding material in the extruder. The extruded composition was injection molded to form test bars suitable for determining the properties of the composition. The moldings were clear, colorless, transparent and non-flammable. The test bars were employed to determine the tensile strength, impact strength, and per cent elongation value of the molded composition. The tensile strength, impact strength and per cent elongation values were determined in accordance with standard test methods. The test pieces used in determining the tensile strength and per cent elongation values were bars of square cross section and having dimensions of 2⅜ inches x ½ inch x ⅛ inch. The bar employed in determining the impact strength was approximately 2 inches long and of ⅛ x ½ inch rectangular cross section. It had a notch of 0.015 inch depth transversely across a ⅛ inch edge along a line midway between the ends of the bar. It was the notched edge of the bar which was struck in measuring the impact strength. Table II gives the values which were determined for the molded composition. As a basis of comparison, the table includes corresponding values for polystyrene of the quality employed in the composition.

Table II

| Material | Tensile Strength, lbs./sq. in. | Impact Strength | Percent Elongation |
|---|---|---|---|
| Polystyrene | 6,250 | 0.42 | 2.8 |
| Composition | 6,150 | 0.40 | 2.7 |

EXAMPLE 3

Three per cent by weight of chlorinated alpha,beta-dibromoethylbenzene was incorporated together with a copolymer of about 75 per cent styrene and 25 per cent alpha-methylstyrene. The resultant composition was molded into test bars and properties of the moldings were determined. The chlorinated alpha,beta-dibromoethylbenzene ingredient had been prepared by passing chlorine into a mixture of alpha,beta-dibromoethylbenzene, a catalytic amount of iron filings and carbon tetrachloride, while maintaining the mixture at 30° to 40° C., and thereafter distilling the mixture to separate the product. A sample of the latter was analyzed and found to contain 16.9 per cent of chlorine and 48.2 per cent of bromine. The corresponding theoretical values for dichlorinated alpha,beta-dibromoethylbenzene are 21.3 per cent of chlorine and 48.0 per cent of bromine. The K value of the chlorinated alpha,beta-dibromoethylbenzene was not determined, but is estimated to be between 0.5 and 2. This estimate is based on the K values, given in Example 1, for the alpha,beta-dibromoethylbenzene and for nuclear chlorinated alpha,beta-dibromoethylbenzenes having chlorine contents less and greater than that of the chlorinated alpha,beta-dibromoethylbenzene employed in the present example, and also upon the effectiveness of these materials as flame-proofing agents. The procedures for incorporating the chlorinated alpha,beta-dibromoethylbenzene in the copolymer of styrene and alpha-methylstyrene, molding the resultant composition and determining properties of the moldings were similar to those described in Example 2. The molded composition, containing the chlorinated alpha,beta-dibromoethylbenzene, was clear, colorless, transparent and non-flammable. Table III gives the properties of the molded composition and the corresponding properties of the untreated copolymer of the kind and quality employed in the composition.

Table III

| Material | Tensile Strength, lbs./sq. in. | Impact Strength | Percent Elongation | Heat Distortion Temp., °C. |
|---|---|---|---|---|
| Copolymer | 8,500 | 0.43 | 3.4 | 96 |
| Composition | 8,890 | 1.13 | 3.0 | 84 |

Other non-flammable alkenyl aromatic resin compositions may be made by the method of the invention. Examples of such other compositions are a solid polymer of ar-methylstyrene having 3, 5, or 10 per cent by weight of alpha,beta-dibromoethyl-pentachlorobenzene uniformly incorporated therewith; and a solid polymer of ar-monochlorostyrene having 1 per cent of alpha-beta-dibromoethyl-2,5-dichlorobenzene incorporated therewith; etc.

In the following claims, each K value given for an organic polybromide is the rate or reaction constant, for chemical addition of bromine to a corresponding olefinic compound, which reaction leads to formation of the organic polybromides. In this sense, the K values represent rates of formation of the organic polybromides.

This application is a continuation-in-part of our copending application, Serial No. 184,334, filed September 11, 1950.

Other modes of applying the principle of the invention may be employed instead of those explained, change being made as regards the method and compositions herein disclosed, provided the steps or ingredients stated by any of the following claims or the equivalent of such stated steps or ingredients be employed.

We therefore particularly point out and distinctly claim as our invention:

1. A non-flammable intimate mixture of (a) a solid, flammable polymer comprising in chemically combined form at least 50 per cent by weight of at least one alkenyl aromatic compound having the general formula:

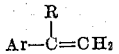

wherein Ar represents an aromatic radical of the group consisting of hydrocarbon and halohydrocarbon radicals of the benzene series and R is a member of the group consisting of hydrogen and the methyl radical, and (b) a minor amount, not exceeding 10 per cent by weight, of a molecularly unsymmetrical organic polybromide having bromine atoms attached to adjacent carbon atoms in an aliphatic portion of the molecule and having a K value of from 0.02 to $4 \times 10^2$.

2. A non-flammable resinous composition comprising (a) a flammable polymer comprising in chemically combined form at least 50 per cent by weight of at least one alkenyl aromatic compound having the general formula:

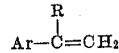

wherein Ar represents an aromatic radical of the group consisting of hydrocarbon and halohydrocarbon radicals of the benzene series and R is a member of the group consisting of hydrogen and the methyl radical, and (b) a molecularly unsymmetrical organic polybromide containing bromine atoms attached to adjacent carbon atoms in an aliphatic portion of the molecule and having a K value of from 0.02 to $4 \times 10^2$, the polymer being in a proportion corresponding to at least 85 per cent of the weight of the composition and the organic polybromide being in a proportion corresponding to between 2 and 10 per cent of the combined weight of the same and the polymer.

3. A non-flammable solid solution of (a) a flammable polymer comprising in chemically combined form at least 50 per cent by weight of at least one alkenyl aromatic compound having the general formula:

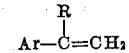

wherein Ar represents an aromatic radical of the group consisting of hydrocarbon and halohydrocarbon radicals of the benzene series and R is a member of the group consisting of hydrogen and the methyl radical, and (b) from 2 to 5 per cent by weight of a molecularly unsymmetrical organic polybromide having bromine atoms attached to adjacent carbon atoms in an aliphatic portion of the molecule and having a K value of from 0.1 to 10.

4. A non-flammable intimate mixture of polystyrene and from 2 to 10 per cent by weight of a molecularly unsymmetrical organic polybromide having bromine atoms attached to adjacent carbon atoms in an aliphatic portion of the molecule and having a K value of from 0.02 to $4 \times 10^2$.

5. A non-flammable resinous composition comprising polystyrene and a molecularly unsymmetrical organic polybromide having bromine atoms attached to adjacent carbon atoms in an aliphatic portion of the molecule and having a K value of from 0.1 to 10, said organic polybromide being in a proportion corresponding to from 2 to 5 per cent of the combined weight of the same and the polystyrene and being incorporated together with the polystyrene.

6. A non-flammable resinous composition comprising (a) a solid, flammable polymer comprising in chemically combined form at least 50 per cent by weight of at least one alkenyl aromatic compound having the general formula:

$$Ar-\overset{R}{\underset{|}{C}}=CH_2$$

wherein Ar represents an aromatic radical of the group consisting of hydrocarbon and halohydrocarbon radicals of the benzene series and R is a member of the group consisting of hydrogen and the methyl radical, and (b) dichlorinated alpha,beta-dibromoethylbenzene, the polymer being in a proportion corresponding to at least 85 per cent of the weight of the composition and the dichlorinated alpha,beta-dibromoethylbenzene being in a proportion corresponding to from 2 to 10 per cent of the combined weight of the same and the polymer.

7. A non-flammable resinous composition comprising polystyrene and dichlorinated alpha,beta-dibromoethylbenzene, the polystyrene being in a proportion corresponding to at least 85 per cent of the weight of the composition and the dichlorinated alpha,beta-dibromoethylbenzene being in a proportion corresponding to from 2 to 5 per cent of the combined weight of the same and the polystyrene and being incorporated together with the polystyrene.

8. A non-flammable resinous composition comprising (a) a solid, flammable polymer comprising in chemically combined form at least 50 per cent by weight of at least one alkenyl aromatic compound having the general formula:

$$Ar-\overset{R}{\underset{|}{C}}=CH_2$$

wherein Ar represents an aromatic radical of the group consisting of hydrocarbon and halohydrocarbon radicals of the benzene series and R is a member of the group consisting of hydrogen and the methyl radical, and (b) alpha,beta-dibromoethyl-pentachlorobenzene, the polymer being in a proportion corresponding to at least 85 per cent of the weight of the composition, and the alpha,beta-dibromoethyl-pentachlorobenzene being in a proportion corresponding to from 2 to 10 per cent of the combined weight of the same and the polymer and being incorporated together with the polymer.

9. A non-flammable resinous composition comprising polystyrene and alpha,beta-dibromoethyl-pentachlorobenzene, the polystyrene being in a proportion corresponding to at least 85 per cent of the weight of the composition, and the alpha,beta-dibromoethyl-pentachlorobenzene being in a proportion corresponding to from 2 to 5 per cent of the combined weight of the same and the polystyrene and being incorporated together with the polystyrene.

10. A non-flammable resinous composition comprising (a) a solid, flammable polymer comprising in chemically combined form at least 50 per cent by weight of at least one alkenyl aromatic compound having the general formula:

$$Ar-\overset{R}{\underset{|}{C}}=CH_2$$

wherein Ar represents an aromatic radical of the group consisting of hydrocarbon and halohydrocarbon radicals of the benzene series and R is a member of the group consisting of hydrogen and the methyl radical, and (b) alpha,beta-dibromoethyl-2,5-dichlorobenzene, the polymer being in a proportion corresponding to at least 85 per cent of the weight of the composition, and the alpha,beta-dibromoethyl-2,5-dichlorobenzene being in a proportion corresponding to from 2 to 10 per cent of the combined weight of the same and the polymer.

11. A non-flammable resinous composition comprising polystyrene and alpha-beta-dibromoethyl-2,5-dichlorobenzene, the polystyrene being in a proportion corresponding to at least 85 per cent of the weight of the composition, and the alpha,beta-dibromoethyl-2,5-dichlorobenzene being in a proportion corresponding to from 2 to 5 per cent of the combined weight of the same and the polystyrene and being incorporated together with the polystyrene.

References Cited in the file of this patent

FOREIGN PATENTS 554,602    Great Britain _____ July 12, 1943